United States Patent [19]

Curry

[11] Patent Number: 4,486,936
[45] Date of Patent: Dec. 11, 1984

[54] APPARATUS FOR REMOVING A ROLLER OR WORKPIECE

[76] Inventor: Paul F. Curry, P.O. Box 775, Glade Spring, Va. 24340

[21] Appl. No.: 308,122

[22] Filed: Oct. 2, 1981

[51] Int. Cl.³ .............................................. B23P 19/04
[52] U.S. Cl. ...................................... 29/252; 29/267; 254/84; 254/124; 254/131
[58] Field of Search .................... 254/84, 85, 131, 124, 254/8 B, DIG. 4, DIG. 1, 2 R, 8 R; 29/267, 252, 281.1, 281.4; 414/728, 742; 269/17

[56] References Cited

U.S. PATENT DOCUMENTS

| 416,990 | 12/1889 | Campbell | 254/84 |
| 682,973 | 9/1901 | Condict | 254/124 X |
| 1,573,918 | 2/1926 | Dewhirst | 254/84 X |
| 2,600,740 | 6/1952 | Drum | 254/84 X |
| 2,814,394 | 11/1957 | Witcher | 254/124 X |
| 3,050,152 | 8/1962 | Blain | 254/2 R |
| 3,086,751 | 4/1963 | Poznik | 254/124 X |
| 3,751,097 | 8/1973 | Jones et al. | 294/78 A |
| 4,118,010 | 10/1978 | Hanscom | 254/124 |
| 4,283,828 | 8/1981 | Cole, Sr. | 29/256 |

FOREIGN PATENT DOCUMENTS 2049614 12/1980 United Kingdom ............... 414/728

Primary Examiner—Robert C. Watson
Assistant Examiner—Steven P. Schad
Attorney, Agent, or Firm—Lane, Aitken & Kananen

[57] ABSTRACT

An apparatus for laterally removing a workpiece, such as a guide roller on an endless track vehicle or motor from a piece of heavy equipment, from a space having limited vertical access. The apparatus includes a base for stably supporting the apparatus in a position laterally adjacent the workpiece, a support member secured to the base, a pivotable frame member pivotally secured to a portion of the support member, a cradle member for receiving and supporting the workpiece, which cradle member is secured to the pivotable frame member to be raised and lowered as the pivotable frame member is pivoted, and a force actuator, such as a hydraulic cylinder, supported by the support member and connected to the rigid pivotable frame member for pivoting it to raise and lower the cradle member as the force actuator is extended and retracted between its extended and stowed positions. The base includes stabilizing members for stabilizing the apparatus as the cradle is raised and lowered and a pair of inwardly facing channel members for receiving cam rollers or wheels on the support member to permit the apparatus to be moved laterally to and fro relative to the space for removing the workpiece.

5 Claims, 7 Drawing Figures

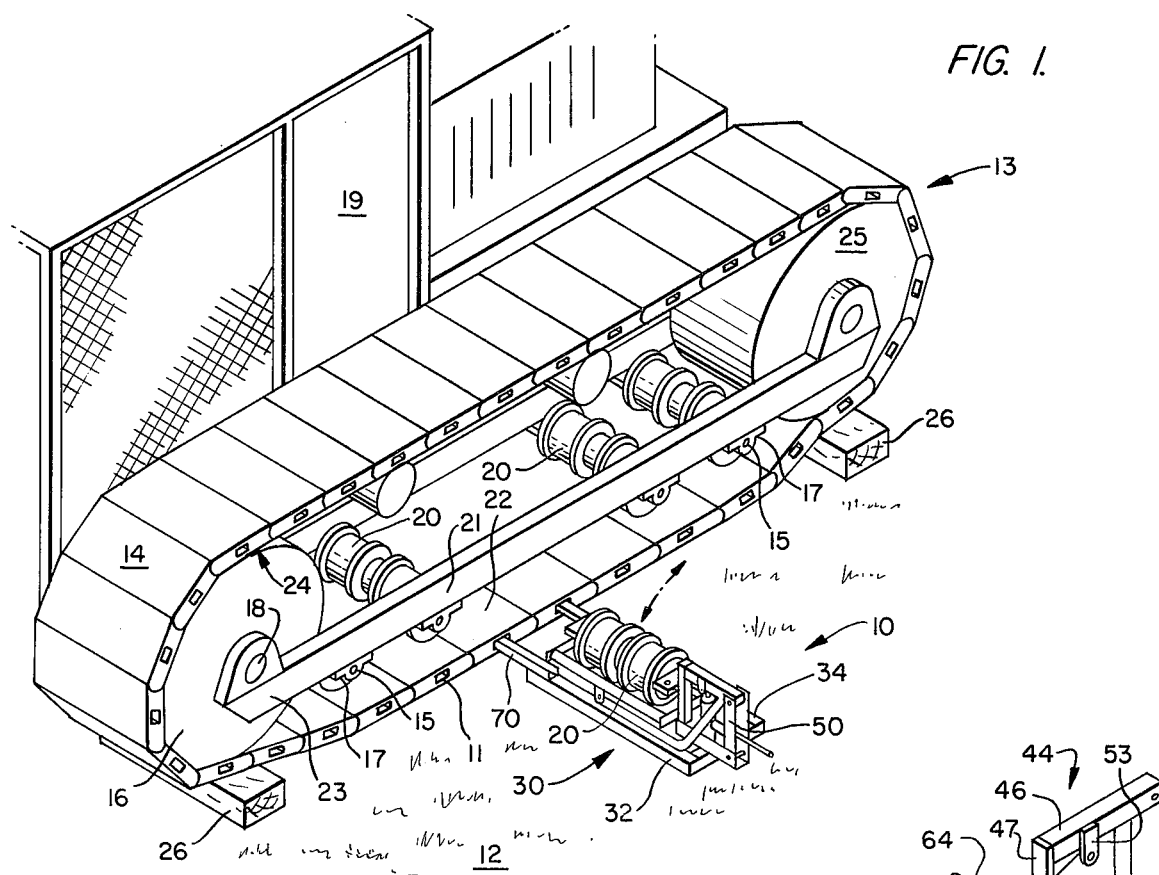
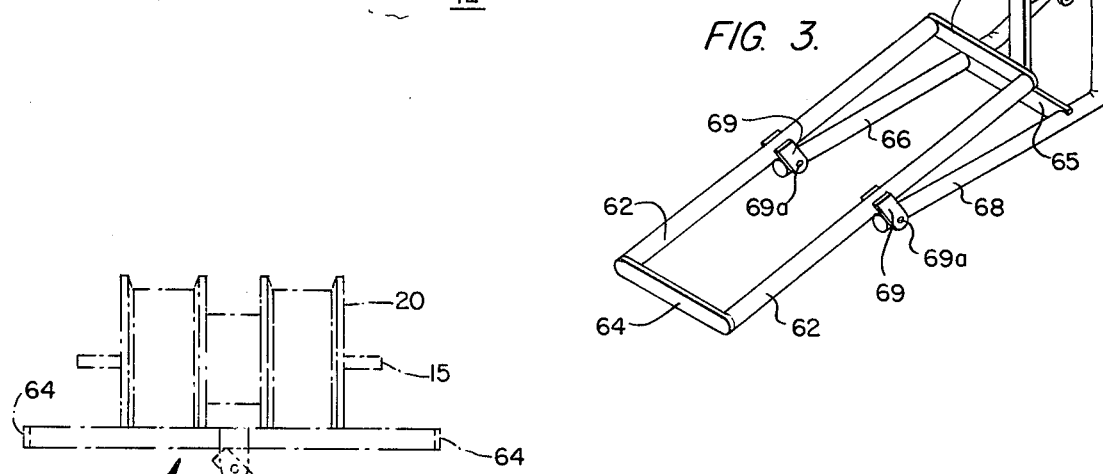
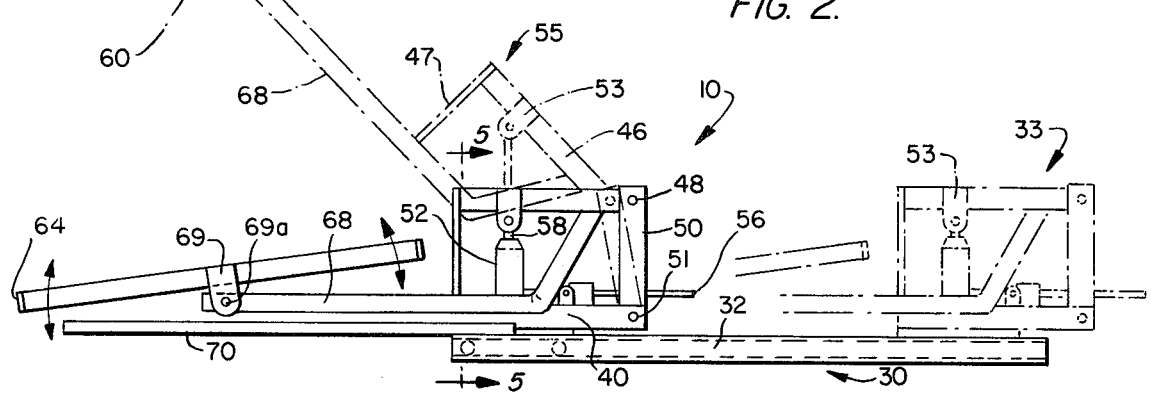

APPARATUS FOR REMOVING A ROLLER OR WORKPIECE

BACKGROUND OF THE INVENTION

This invention relates generally to an apparatus for laterally removing a workpiece from a space having limited vertical access. More particularly, this invention relates to an apparatus for removing and replacing a workpiece such as a guide roller on an endless track vehicle or a motor on a piece of heavy machinery.

In the prior art, it is a continuing problem to remove a workpiece from a space having limited vertical access for repair or maintenance, particularly when the workpiece is heavy or awkward. In connection with vehicles of the crawler type which have endless tracks, for example, it has been a particularly time consuming process for removing and replacing one or more of the guide rollers for the endless track. As explained in U.S. Pat. No. 4,283,828, in the past it has been necessary to remove the guide rollers of such vehicles on a periodic basis for service, repair or replacement. In the past, this has been done by workmen using jacks and blocks, even if only a single roller is to be changed. In this regard, it has been necessary to separate the tracks, remove the truck frame from the vehicle, and invert the frame so that all of the rollers are disposed upwardly for removal one at a time and inspection, repair or replacement as necessary.

In the U.S. Pat. No. 4,283,828, a tool is provided to permit one man to be able to remove and replace the guide rollers in substantially less time than that required in the prior art. That device utilizes a traveling block mounted on a base which includes a pair of adjustment means, one of which includes a cradle for receiving the workpiece in a way in which the cradle and the article could travel to and from the traveling block. The other adjusting means selectively moves the traveling block upwardly and downwardly relative to the base and in the form there disclosed constitutes a manually operated screw jack.

It is an overall aim of this invention to provide an apparatus for conveniently and quickly removing a workpiece from a space having limited vertical access.

More particularly, it is an object of this invention to provide such an apparatus for quickly and efficiently removing a guide roller from an endless track vehicle so that the roller may be repaired or replaced.

It is still a further object of this invention to provide an apparatus for removing a workpiece, such as a guide roller or a motor, from a piece of machinery defining a space having limited vertical access.

These and other objects of this invention will become apparent from a review of the written description of the invention which follows and the brief description of the drawings.

BRIEF SUMMARY OF THE INVENTION

Directed to achieving the aforestated objects and overcoming the problems of the prior art, this invention relates to an apparatus for laterally removing a workpiece from a space having limited vertical access. The apparatus includes a base for stably supporting the apparatus in a position laterally adjacent the workpiece. A support member secured to the base supports a rigid pivotable frame member secured to a portion of a support member. A cradle member for receiving and supporting the workpiece, such as a roller from a crawler-type vehicle, or a motor, is secured to the pivotable frame member to be raised and lowered as the pivotable frame member is pivoted. A force actuator, preferably a hydraulic cylinder, is also supported by the base and connected to the rigid pivotable frame member for pivoting the frame member to raise and lower the cradle member as the force actuator is extended and retracted between its extended and stowed positions.

The apparatus also includes stabilizing means which may be stowed along the base and extended to the front or the side of the apparatus for stabilizing the apparatus in the manner in which an outrigger stabilizes construction machinery. Preferably, the stabilizers include a pair of extending tubes which may be inserted in openings in the treads of an endless track thereby to support the apparatus.

The apparatus includes a pair of opposed inwardly facing channel members defining a guide path for receiving wheels on the support member so that the support member, the pivotable frame member, the cradle member, and the force actuator can be laterally moved to and fro along the extent of the channel members of the base.

These and other details of the construction of the apparatus according to the invention will become apparent from a written description of the invention which follows taken in conjunction with the accompanying drawings.

BRIEF DESCRIPTION OF THE DRAWINGS

In the drawings:

FIG. 1 is a perspective view of the apparatus according to the invention, laterally movable to and from a piece of machinery, shown in the form of an endless track crawler-type vehicle from which it is desired to remove the guide rollers for examination, repair or replacement;

FIG. 2 is a side elevational view of the apparatus according to the invention showing in solid lines the apparatus in its lowered or unextended position and in phantom lines both its raised and retracted positions;

FIG. 3 is a perspective view of a portion of the apparatus similar to that shown in FIG. 2, illustrating the components of the pivotable frame member connected to the cradle;

DETAILED DESCRIPTION OF THE PREFERRED EMBODIMENTS

Figure 4:
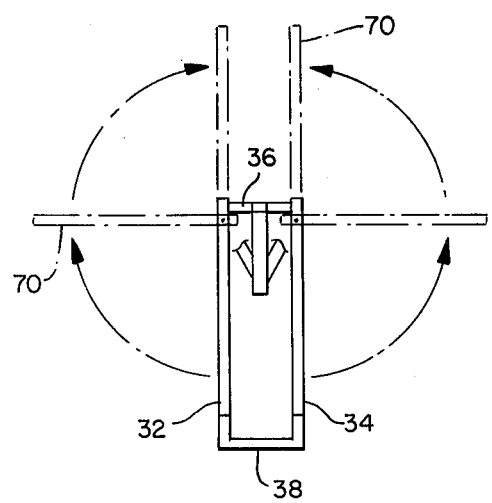
FIG. 4 is a diagrammatic plan view, partially in phantom outline, showing alternate positions of the stabilizing members.

In FIG. 1, the apparatus according to the invention is designated generally by the reference numeral 10. The apparatus 10 is positioned on the ground 12 adjacent to a piece of machinery shown in FIG. 1 as a crawler-type vehicle 13 of conventional construction. The vehicle 13 includes an endless track 14 on each side thereof, only one of which is shown in FIG. 1. The endless track 14 is driven by a drive wheel 16 mounted on an axle 18 driven by the power plant 19 of the vehicle.

The endless track 14 is supported on its lower end thereof by a plurality of guide rollers 20. Because such guide rollers must be periodically inspected for repair or replacement, it is a principal intended use of the apparatus 10 to permit the removal, inspection and replacement of a workpiece, such as a guide roller 20, as will be described in greater detail.

As is well known in the art, the plurality of endless track guide rollers 20 are mounted on a truck frame 21 which usually has a web portion 23 and depending flanges 17 to which the axle 15 of the guide roller 20 is removably connected. Normally, the guide rollers 20 engage a rail forming part of the endless track 14 for supporting the vehicle intermediate drive and idler sprockets 24 and 25, respectively.

When it is desired to service, repair or replace one or more of the guide rollers 20, a pair of spaced support blocks 26 are placed on the ground and the vehicle 13 is driven onto such blocks so that the drive and idler sprockets are located above such blocks. The idler sprocket is retracted to provide a slack shown at the reference numeral 22 in the lower run of the endless track 14 to permit it to sag into engagement with the ground 12. Thus, the rail of the endless track is moved out of engagement with the support and guide rollers.

To remove a guide roller 20 from the vehicle 13, the apparatus 10 is fixedly positioned at a position on the ground 12 laterally adjacent to the vehicle 13. Because the apparatus 10 has a portion which is laterally translatable relative to a base 30, as will be discussed in greater detail hereinafter, it is so positioned that the cradle 60 can be positioned beneath the guide roller 20. The guide roller is then removed from the vehicle 13 to rest on the cradle 60, whereupon the cradle is removed by either or both lowering the cradle and retracting the apparatus and the apparatus 10 is retracted for repair or replacement or the roller as necessary. In their preferred position, stabilizing members 70, which will be discussed in greater detail, may be extended forwardly or laterally of the vehicle for stabilizing the apparatus 10. Preferably, as shown in FIG. 1, the stabilizing members 70 are inserted in openings 11 in the treads of the track 14. Alternatively, a stabilizing member can be positioned to rest on the ground or on the track 14.

FIG. 2 shows the apparatus 10 in a lowermost, unextended, forwardmost position for clarity apart from the vehicle 13. The apparatus includes a base designated generally by the reference numeral 30 which includes a pair of opposed, inwardly facing, channel members 32 and 34, respectively, connected by cross members 36 and 38 to form a stable, load-bearing base. The base is sized to support the apparatus 10 in a stable manner for intended loading. The channel members 32 and 34 define a guide path for receiving a plurality of roller cams or wheels 39 (best seen in FIG. 5) so that the structure, as hereinafter described, can be laterally translated or moved to and fro along the extent of the channel members 32 of the base 30. The forward position is shown in FIG. 2 by solid lines, while the aft position is shown by the dotted lines designated generally by the numeral 33. This to and fro movement permits the cradle 60 of the apparatus 10 to be positioned beneath the roller 20 prior to removal and to permit retraction of the roller from which the confines of the vehicle 13, as shown in FIG. 1, for replacement, inspection or repair.

The apparatus 10 also includes a rigid base member 40 which includes the plurality of wheels 39 for traversing the guide paths defined by the channels 32 and 34 as described above. The base member 40 includes a platform portion 42 to which is secured a rigid, L-shaped, pivotal frame member 44 having a leg 46 thereof, pivotally connected at pin 48 to an upstanding, rigid, support member 50, pivotally connected at pin 51 to the base member 40.

A force actuator 52, such as a hydraulic cylinder, is fixed between the platform portion 42 and a clevis 53 secured to the underside of the frame member 46. In the form shown, the force actuator 52 is a hydraulic cylinder which can be actuated by a lever 56 for extending or retracting the actuating member 58 of the force actuator 52 between its extended and stowed positions. FIG. 2 shows in solid lines the force actuator in its stowed position, while the dotted lines designated generally by the numeral 55 show the force actuator having its actuating member in its extended or upraised position. When raised, the members 46 and 50 are free to pivot as necessary about the pins 48 and 51 to raise the cradle 60.

The cradle 60 is defined by a pair of laterally-extending support members 62 secured by a plurality of longitudinally positioned support members 64 to define the cradle 60 for receiving the roller 20 as shown. The particular form or contour of the cradle 60 can be adapted to the particular workpiece which, as shown, is in the form of a roller.

The other leg 47 of the pivotable frame member 44 is secured at the end opposite the leg 46 to a member 65 connected between a pair of support tubes 66 and 68 (see FIG. 3) which together form a bifurcated support structure to permit ease of access and actuation of the extending member 58 of the hydraulic cylinder. One end of each of the pair of support tubes 66 and 68 is connected by a connector 69 to a support member 62 of the cradle 60 while the other end is connected to the leg 46 of the frame member at or near the pivot point 48. The connectors 69 are fixed to the tubes 62 and pivotable at the pin connections with the members 66 and 68.

As shown in FIG. 3, the cradle 60 is pivotable slightly about the pivot points 69a at the connection of the support tubes 66 and 68 to the members 64 of the cradle member 60. This slight pivoting permits ease of entry of the cradle member beneath the roller while the roller 20 is still secured to the vehicle 13 prior to removal and also assists in locating and balancing the roller 20 on the cradle member after removal for stability.

FIG. 4 shows in phantom the flexibility of the apparatus 10 in positioning the stabilizing members 70. At rest, or while the apparatus 10 is being transported to a job site, the members 70 may lie on top of the base frame members 32 and 34, in a direction parallel with them. In the presently preferred mode, as also shown in FIG. 1, the stabilizing members 70 extend forwardly from the apparatus 10. Because the tracks 14 of a crawler-type vehicle generally have tread openings 11 on the order of 2" by 2", the stabilizers 70 may be made from 1" bar stock or tubes to be inserted into the openings 11. Alternatively, the stabilizer may extend at some other selected angle over the slightly more than 180 degree range shown to allow the apparatus to be efficiently used on irregular terrain or in close quarters. In addition, the stabilizers can be positioned alternately, such as having one in the opening 11 and the other extending at about 90 degrees from the apparatus.

Figure 5:
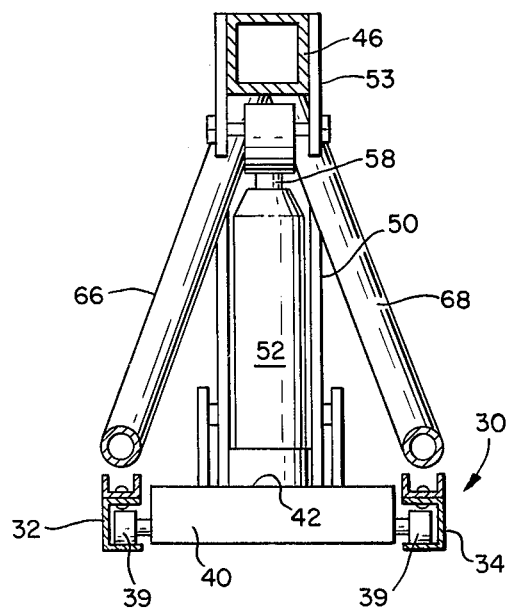
FIG. 5 is a cross section taken along line 5—5 of FIG. 2 showing the guide tracks of the base formed in opposed channels for receiving wheels or cam rollers on the support member for guiding the apparatus laterally to and fro relative to a machine.

FIG. 5 is a cross sectional view of a portion of the base frame members 32 and 34 defining the guide channels and showing the positioning of the wheels 39 on the base 40. This structure is arranged so that the base 40, the platform portion 42, the pivotable frame member 44, the cradle 60, and the force actuator 52 can be laterally moved with the wheels 39 to and fro along the extent of the channel members 32 and 34 of the base frame.

The combination of the to and fro capability of the apparatus 10 and its ability to raise and lower the cradle 60 permits easy positioning of the apparatus adjacent a vehicle 13. The cradle 60 is thereafter easily positioned beneath the roller, and raised slightly, if necessary, for lifting and lateral removal.

Figure 6:
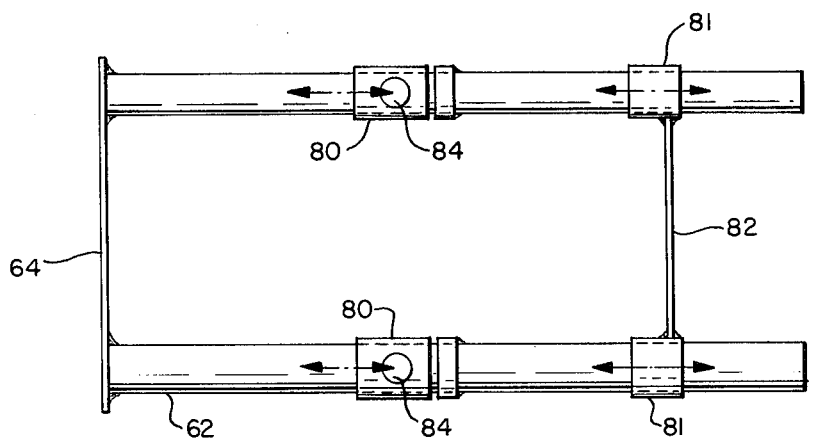
FIG. 6 is a top view of an alternative embodiment of the cradle member secured to the support member to permit lateral adjustment for stabilizing the workpiece on the cradle.
Figure 7:
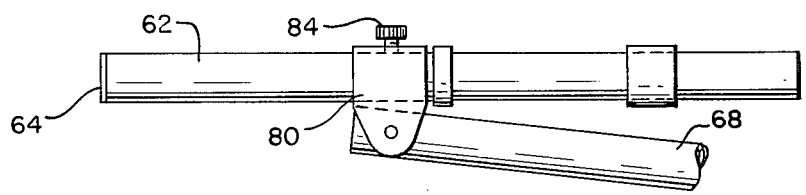
FIG. 7 is a side view of the alternative embodiment of the cradle member shown in FIG. 6.

FIGS. 6 and 7 illustrate an alternative embodiment designed to serve shorter length units with restricted clearance in the forward direction. A telescoping collar member 80 is arranged to slide along the support member 62 so as not to extend more than half way out and the rear cross member 82 also slides thereon so that the workpiece can always be centered on the tilt mechanism for easier raising and lowering of the heavy units. As shown, the cross member 82 is secured to a second telescoping member 81. A suitable securing means 84, such as a thumb screw, may be provided to secure the members 80 and 81.

Thus, adjustment of the collar member 80 is primarily for balancing the load on the carriage which, in effect, is defined by an adjustable rectangle defined at one side of the cross member 82.

The adjustability of the rectangle defined at one side of the cross member 82 eliminates or minimizes the protrusion of the carriage beyond the workpiece, thereby enabling this alternative embodiment to serve shorter length workpieces having restricted clearance in the forward direction.

This invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. An apparatus for laterally removing a workpiece from a space in a machine at rest about on a first level having limited vertical access comprising:
   a base, including a base member, for stably supporting said apparatus at about said first level in a position laterally adjacent and remote from said workpiece, said base including stabilizing means extending from said base for stabilizing said apparatus as a cradle is raised or lowered, said stabilizing means including a frame member which is pivotable at least between a position forward of said base and lateral to said base;
   a support member movably secured to said base member for movement relative to said base toward and away from said workpiece;
   a rigid pivotable frame member pivotally secured to a portion of said support member;
   a cradle member for receiving and supporting said workpiece, said cradle member being secured to said pivotable frame member to be raised and lowered as said pivotable frame is pivoted; and
   a force actuator supported by said base and connected to said rigid pivotable frame member for pivoting said pivotable frame member to raise and lower said cradle member as said force actuator is extended and retracted between its extended and stowed positions, and wherein said support member, said frame member, said cradle member, and said force actuator are movable toward and away from said workpiece on said base member relative to said base.

2. The apparatus as set forth in claim 1, wherein said base includes a pair of opposed, inwardly-facing channel members defining a guide path for receiving wheels on said support member so that said support member, said pivotable frame member, said cradle member, and said force actuator can be laterally moved to and fro along the extent of said channel members of said base.

3. The apparatus as set forth in claim 1, wherein said cradle member is pivotably secured to said pivotable frame member which further includes means for restricting the extent of pivoting for facilitating receiving and stably supporting said workpiece thereon.

4. The apparatus as set forth in claim 1, wherein said force actuator is a fluid-operated cylinder which includes an extendible actuated member extendible between a stowed and extended position.

5. An apparatus for laterally removing a workpiece from a space having limited vertical access comprising:
   a base, including a base member secured thereon and relatively movable relative thereto, for stably supporting said apparatus in a fixed position laterally adjacent and both horizontally and vertically removed from said workpiece, said base including stabilizing means extending from said base for stabilizing said apparatus as said cradle is raised or lowered, said stabilizing means including a frame member which is pivotable at least between a position forward of said base and lateral to said base;
   a generally vertical support member pivotally secured at one end to said base member secured on said base;
   a rigid, generally horizontal, pivotable frame member pivotally secured to a portion of said support member spaced from said one end;
   a cradle member for receiving and supporting said workpiece, said cradle member being secured to said pivotable frame member to be raised and lowered to traverse a vertical distance as said pivotable frame member is pivoted; and
   a force actuator supported by said base and connected to said rigid pivotable frame member for pivoting said pivotable frame member to raise and lower said cradle member as said force actuator is extended and retracted between its extended and stowed positions, and wherein said support member, said frame member, said cradle member, and said force actuator are movable toward and away from said workpiece on said base member relative to said base, thereby to traverse a horizontal distance between the location of said base and the location of said workpiece.

* * * * *